(12) United States Patent
Lund et al.

(10) Patent No.: US 10,206,330 B1
(45) Date of Patent: Feb. 19, 2019

(54) SAPLING REDUCING APPARATUS

(71) Applicants: Loren A. Lund, Bassett, NE (US); Marilyn T. Lund, Bassett, NE (US)

(72) Inventors: Loren A. Lund, Bassett, NE (US); Marilyn T. Lund, Bassett, NE (US)

( * ) Notice: Subject to any disclaimer, the term of this patent is extended or adjusted under 35 U.S.C. 154(b) by 0 days.

(21) Appl. No.: 15/951,625

(22) Filed: Apr. 12, 2018

Related U.S. Application Data (60) Provisional application No. 62/507,277, filed on May 17, 2017.

(51) Int. Cl.
*A01D 34/43* (2006.01)
*A01D 34/835* (2006.01)

(52) U.S. Cl.
CPC ........... *A01D 34/43* (2013.01); *A01D 34/835* (2013.01)

(58) Field of Classification Search
CPC .......... E02F 3/407; E02F 3/40; A01D 34/435; A01D 34/535; A01D 34/47; A01D 34/662; A01D 34/10; A01D 34/43; A01D 34/835; A01G 23/093; A01G 23/067; A01G 3/002; A01B 45/026
See application file for complete search history.

(56) References Cited

U.S. PATENT DOCUMENTS

| | | | | |
|---|---|---|---|---|
| 2,659,188 A | * | 11/1953 | Haban | A01D 43/10 172/45 |
| 2,924,054 A | * | 2/1960 | Myers | A01D 34/435 56/13.3 |
| 2,990,667 A | * | 7/1961 | Schwalm | A01D 34/435 56/12.7 |
| 3,159,959 A | * | 12/1964 | Mathews | A01D 34/435 280/489 |
| 4,338,985 A | * | 7/1982 | Smith | A01G 23/093 144/337 |
| 4,624,197 A | * | 11/1986 | Drake | A01B 51/04 111/52 |
| 4,690,224 A | * | 9/1987 | Shwez | A01D 34/435 172/28 |
| 4,804,047 A | * | 2/1989 | Kobashi | A01B 33/144 172/125 |
| 4,905,460 A | * | 3/1990 | Toman | A01B 45/026 56/12.7 |
| 5,103,624 A | * | 4/1992 | Marshall | A01D 34/435 172/176 |
| 5,405,092 A | * | 4/1995 | Jonninen | C05F 17/0241 241/101.72 |
| 5,485,689 A | * | 1/1996 | Jonninen | E02F 3/404 37/189 |

(Continued)

*Primary Examiner* — Jamie L McGowan
(74) *Attorney, Agent, or Firm* — Ryan T. Grace; Advent, LLP (57) ABSTRACT

A sapling reducing implement for reducing a sapling generally includes a drum, a plurality of reducing elements, a plurality of shields, and a pair of skids. The drum is configured to be rotatably driven and to carry the reducing elements thereon. The shields at least partially surround the drum and reducing elements. The reducing elements are configured to extend within an inch of the ground during a downward portion of the drum's rotational cycle. The shields define, at least in part, a tree entrance opening to receive the sapling. The ground skids are respectively attached to the side shields and can engage the ground during travel.

17 Claims, 8 Drawing Sheets

(56) References Cited

U.S. PATENT DOCUMENTS

| | | | | |
|---|---|---|---|---|
| 5,499,771 | A | * | 3/1996 | Esposito .............. A01G 23/067 144/24.12 |
| 5,666,794 | A | * | 9/1997 | Vought ................... A01D 41/16 172/112 |
| 6,321,518 | B1 | * | 11/2001 | O'Hagan .............. A01D 34/535 144/34.1 |
| 6,659,378 | B2 | * | 12/2003 | Di Anna ................ A01G 3/002 241/101.77 |
| 7,096,900 | B2 | * | 8/2006 | Schafer ................ A01G 23/093 144/24.12 |
| D633,112 | S | * | 2/2011 | Dairon .......................... D15/10 |
| 7,997,053 | B2 | * | 8/2011 | Dairon ................ A01B 33/087 56/249 |
| 8,360,249 | B1 | * | 1/2013 | Currey ..................... B07B 1/15 209/671 |
| 2004/0244350 | A1 | * | 12/2004 | Schafer ................ A01G 23/093 56/249 |
| 2006/0242864 | A1 | * | 11/2006 | Jonninen ................... E02F 3/40 37/433 |
| 2010/0095561 | A1 | * | 4/2010 | Risi ........................ E02F 3/407 37/403 |
| 2010/0162592 | A1 | * | 7/2010 | Mannikko ............... B01F 7/002 37/403 |
| 2010/0192424 | A1 | * | 8/2010 | Mannikko ............... E02F 3/407 37/403 |
| 2011/0010968 | A1 | * | 1/2011 | Mannikko ............... B02C 13/13 37/403 |

\* cited by examiner

SAPLING REDUCING APPARATUS

RELATED APPLICATIONS

This application claims domestic priority to U.S. Provisional Application No. 62/507,277, filed on May 17, 2017, and entitled "SAPLING REDUCING APPARATUS," the contents of which are incorporated by reference thereto.

BACKGROUND

Many varieties of trees (e.g., cedar, crabapple, etc.) are known for yielding a large number of saplings in any given year. Such numbers can exceed what the ground in the vicinity of such trees is able to support, even if the desire may be to allow some of such saplings to grow. In other instances, the desire is to get rid of the saplings altogether. In any case, the owner of the adult tree and the related saplings can be left with transplanting and/or simply eliminating (e.g., via cutting or, if young enough, mowing) some or all of the saplings.

Cedar trees have proven to be particularly prolific in producing saplings. They can be particularly challenging to effectively remove. First of all, upon sprouting from the ground, their branches can be nearly at ground level, meaning that use of a regular mower and/or brush cutter to cut off such saplings may leave enough of the sapling intact (e.g., a sapling with any branches left) so that it can merely grow back. Secondly, if allowed to grow for 3-5 years or more, the saplings can reach a height (e.g., over 30 inches) and/or diameter (e.g., 3+ inches) that can typically require use of larger scale equipment to facilitate their removal.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure relate to a reducing implement. The reducing implement can generally include a drum, a plurality of reducing elements, a plurality of shields, and a pair of ground skids. The drum can be configured to be rotatably driven by a drive unit. The plurality of reducing elements can be mounted to the drum. The plurality of shields can at least partially surround the drum and the reducing elements, and the plurality of shields can include a pair of side shields. The drum can be rotatably mounted relative to the side shields. The pair of ground skids can respectively be mounted on the corresponding side shields.

DRAWINGS

The detailed description is described with reference to the accompanying figures.

DETAILED DESCRIPTION

Overview

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

A sapling reducing (e.g., mulching, grinding, cutting) implement, in accordance with an example embodiment of the present disclosure, can incorporate a plurality of reducing elements (e.g., in the form of flails and/or knives) mounted to a rotatable drum, with the drum configured to rotate generally parallel to the ground and at relatively high speed (e.g., 800 or more revolutions per minute (RPM) and, possibly, 1200+ RPM, based on the motor being used to drive the drum). The reducing elements can therefore engage a sapling along a length thereof, from its base adjacent the ground to a height of, for example, 25-30 inches. By being able to impact a sapling from ground level and not just at higher levels (e.g., 2-3 inches or higher, per a mower or brush cutter), the sapling reducing implement can reduce or possibly eliminate the chance of the sapling growing back upon being acted upon (e.g., mulched, cut, ground) by this implement. The aspect of removing the sapling close to the ground (e.g., at a height of one inch or less or, possibly ½ inch or less) can be particularly important when dealing with cedar and/or other coniferous saplings, as such saplings tend to have branches that protrude close to ground level upon early-stage growth of the sapling. Also, per some embodiments, by cutting off a sapling immediately adjacent the ground avoids leaving much, if any, of a stump behind in its place. It is to be understood that such a sapling reducing implement may be similarly used to reduce other woody vegetation, such as brush and small trees.

In some embodiments, the drum and drum-mounted reducing elements act together as a hammermill arrangement. As a hammermill, the reducing elements can shred, grind, and/or mulch the saplings that come into contact with them as result of repeated impacts (e.g., based on being rotated at, e.g., 500+ RPM and, possibly, 1500+ RPM) from the reducing elements. In some embodiments, upon being impacted by the hammermill, the saplings may be reduced to mulch. In some embodiments of the hammermill arrangement, the reducing elements are rotatably mounted relative to the drum (e.g., rotor). Such rotatable mounting can provide a level of impact forgiveness (e.g., via rotary displacement) if, for example, one or more of the reducing elements impacts a rock or uneven terrain, thus possibly facilitating a longer use life thereof. In some embodiments, the reducing elements can be straight and not curved forward (unlike, e.g., flails used with bale processors). Being straight may reduce the production cost associated with a given flail or knife and may contribute to its robustness and expected lifetime. The reducing elements can be arranged in any of a range of generally balanced patterns on the drum and may be arranged such that one or more reducing elements are aligned within a given cyclical path. In some embodiments, a plurality of such reducing elements (e.g., 2-5) is employed in a path, providing multiple impacts on a sapling within a particular cyclical path during a single revolution of the drum.

The reducing elements may be provided with surface features that can, for example, improve their wear-life and/or increase their reducing capability. The reducing elements may be provided with serrations and/or knife-edges at their free, distal end (i.e., end not attached to the drum) and/or along one or both of the long edges associated therewith, to promote an ability to cut and/or grind through the sapling(s). It is to be understood, however, that, in some embodiments, no serrations and/or knife-edges may be provided, with the reducing elements relying more so upon high-speed impact thereof with the sapling to effect sapling reduction. Alternatively and/or additionally, at least a portion (e.g., the impact and/or cutting region) of each of the reducing elements may be hardfaced (e.g., with tungsten carbide and/or another type of carbide; or with a hard alloy (e.g., cobalt-based, nickel-based, or chromium-carbide-based)) and/or hardened (e.g., tempered). Such hardfacing or hardening can be provided, for example, to improve the wear life of a given flail or knife and/or increase the reducing capability thereof (e.g., via improved hardness and/or by creating a gritted/rough surface, with the latter facilitating a grinding and/or tearing action upon contact with a sapling).

In some embodiments, the reducing elements may be made of a material that is, for example, robust and rigorous enough to withstand the present hammermill use environment. Factors to be considered in that regard are, e.g., stiffness, density (e.g., weight), toughness, and wear-resistance. The stiffness and/or weight of a reducing element (e.g., a flail or knife) can, for example, translate into the impact the reducing element is able to generate upon contact with a sapling. Example candidate materials are a tool steel, heat-treated (e.g., tempered) steel, and/or a hardened steel.

The hammermill can be driven by a motor and/or engine (i.e., a drive unit) to provide a requisite amount of power (e.g., horsepower (HP)), amount of torque, and/or rate of impacts (e.g., RPM generated by motor multiplied by a number of flails or knives in a circumferential section of the drum) to effectuate the reduction of the saplings. The motor or engine, by way of example, may be a gas-powered engine, an electric motor, or a fluid-driven (e.g., pneumatic or hydraulic) engine. In some embodiments, the drive unit (e.g., the motor or engine) of the sapling reducing implement is carried as a unit with the hammermill portion (e.g., mounted above or at a side of the hammermill, e.g., on one of the shields or via a mounting bracket). In some embodiments, though, the drive unit (e.g., a fluid-driven engine) for the hammermill may be provided by an off-road vehicle carrying the hammermill portion. The off-road vehicle can, by way example, be an all-terrain vehicle (ATV), a skid loader, a tractor (e.g., garden or full size), a mini skid steer, or other utility vehicle.

The drive unit may be chosen to provide sufficient power and/or torque to be able reduce saplings that are, for example, up to 25-30 inches tall and/or up to 2-3 inches in diameter. A 5-10 HP engine and, more particularly, a 5-7 HP engine may be appropriate. A 5-10 HP engine may yield, for example, 1000+ RPM or even 2000+ RPM, dependent on the level of torque desired. In some embodiments, a smaller motor or engine (e.g., 5-10 HP) may provide sufficient sapling reduction capabilities while still being relatively light weight (e.g., readily transported in an agile manner by, for example, an all-terrain vehicle (ATV), a mule vehicle, a mini skid steer, or a garden tractor, when used as part of the present sapling reduction implement) and inexpensive (e.g., both to purchase and operate). It is to be understood, however, that a larger (10+HP) motor may be employed, e.g., to drive a larger-scale sapling reduction apparatus (e.g., with a wider hammermill zone) and/or to facilitate reduction of larger saplings or small trees (e.g., more than 30 inches tall and/or more than four inches in diameter). While a larger-scale unit may be more efficient in reducing small trees or larger saplings, it is to be understood that, in embodiments, a smaller unit (e.g., using an accompanying smaller drive unit) may still be used to reduce larger saplings or small trees.

The sapling reducing implement (e.g., including the hammermill, the motor/engine, and any related shielding and/or ground-engaging skids) can be sized, powered, and otherwise configured so as be able to reduce (e.g., mulch) most smaller saplings (e.g., 20-25 inches or less in height) in a single pass. However, it is to be understood that multiple passes and/or longer reducing times may be needed when working to remove bigger and/or more resilient saplings. Both of these scenarios are considered to be within the scope of use of the sapling reducing implement, in accordance with an embodiment of the present disclosure.

The sapling reducing implement may be carried by any of a range of off-road vehicles, and/or, such as, but not limited to, an all-terrain vehicle (ATV), a mule vehicle, a garden tractor, a skid loader, and a utility tractor. In some embodiments, the off-road vehicle and/or utility tractor carrying the sapling reducing element may be provided with a fluid (e.g., pneumatic or hydraulic) drive system (e.g., a pump, a fluid source, a fluid delivery system, and related controls). If provided, such a fluid drive system may be used to power the sapling reducing element and/or selectively to raise or lower the sapling reducing implement. In some embodiments (e.g., where a fluid drive system is not available), the sapling reducing implement may be mounted so as to be moved (e.g., manually) between and retained (e.g., via a retention pin) at a raised (e.g., travel) position and a lowered (e.g., work) position.

The sapling reducing implement can further include a set of skids upon which the hammermill portion and, if carried by the hammermill portion, the drive unit are able to ride. The skids are configured to engage the ground and thereby support the sapling reducing implement. In some embodiments, there is a pair of skids, one on either side of a sapling receiving opening of the hammermill portion, and the skids may aid (e.g., via laterally-slanted and/or curved leading ends (i.e., directed toward the sapling receiving opening)) in guiding a given sapling into the sapling receiving opening. In some embodiments, those same leading ends may be vertically, upwardly curved, as well, to promote traversal of the terrain. In some embodiments, the vertical curvature is limited to the laterally-slanted portion to help ensure that sapling enters the hammermill zone and is not simply ran over by the skid.

The skids can also aid in maintaining an appropriate spacing between the rotatable reducing elements and the ground surface. Particularly, it can be desirable to minimize contact with the ground to avoid unnecessary wear of the reducing elements, while keeping the reducing elements coming close enough to the ground (i.e., on the downward portion of their radial path) so as extend to a point below any lowest branches of a sapling. In some embodiments, the skids may include a plurality of vertical mounting slots (e.g., ¼-¾ inch long, or, more particularly, ½ inch long) or a set of vertically-spaced mounting holes to which the hammermill portion/section may selectively be bolted. Such selective bolting can permit the hammermill portion to be adjustably mounted vertically relative to the skids, e.g., to accommodate differing terrain conditions and/or wear-induced shortening of the reducing elements.

Example Implementations

FIGS. 1-4 illustrate a sapling reducing implement 100, in accordance with an embodiment of the present disclosure. The sapling reducing implement 100, such as that shown in FIGS. 1-4, can include a drum 101, a plurality of reducing elements 102 (e.g., in the form of flails and/or knives), a plurality of shields 103, a plurality of ground skids (e.g., slides) 104, an outwardly curved front shield 105, a set of bearing units 106, an interior guide member 107, and a drive shaft 108. A tree residue exit 109 is a gap defined between a lower most portion (not expressly labeled) of the interior guide member 107 and the reducing elements 102, particularly those closest to the ground G at a given point in time, where any tree or other woody residue (not shown) can exit the system on to the ground G. The plurality of shields 103 may include a top shield 103a, a rear shield 103b, a bottom extension shield 103c, and/or a pair of side shields 103d and 103e. The designations "top", "bottom", "rear", and "side" here are considered in relation to the use environment of the sapling reducing implement 100 (e.g., positioned on the ground G and set to approach one or saplings S). In some embodiments, such shields 103 may be welded to one another to yield an overall containment and/or mounting unit for the sapling reducing implement 100. The pair of side shields 103d and 103e may respectively have a corresponding recessed shield area 110a and 110b defined therein. It is to be understood that, in some embodiments, no top shield may be provided, but a mounting bracket (e.g., mounted to and extending between the side shields 103d and 103e) may be included to stabilize the shield unit and/or to serve as a drive unit mounting location. Further, in some embodiments, the rear shield 103b and the bottom extension shield 103c may not be employed, instead relying on the interior guide member 107 to provide the structural interconnection between the side shields 103d and 103e. The sapling reducing implement 100 can further have a drive connection 111 (e.g., a pulley per the illustrated embodiment) to permit linkage of the drum 101 to a drive unit D, such as that shown in FIG. 6 and described later.

Figure 4:
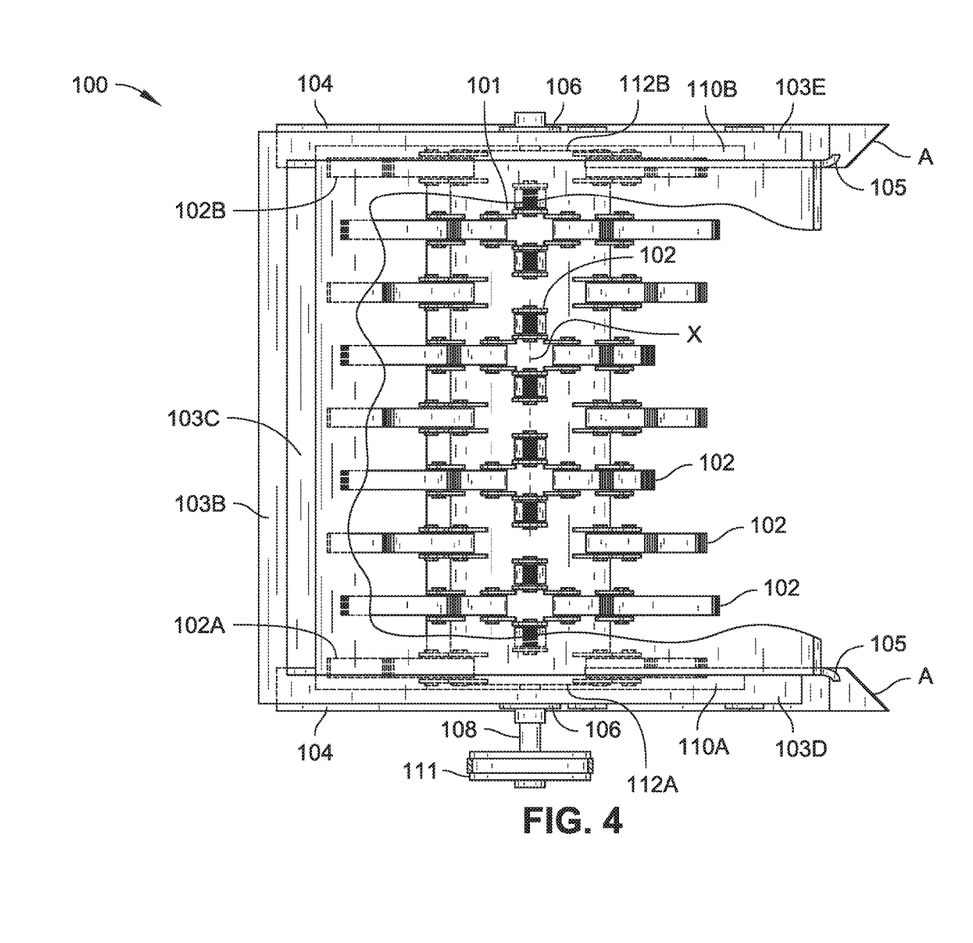
FIG. 4 is a top view of the sapling reducing implement shown in FIG. 1, without any top shielding shown and with a partial cut-away of the interior guide member, for ease of viewing of the drum and the reducing elements.
Figure 5:
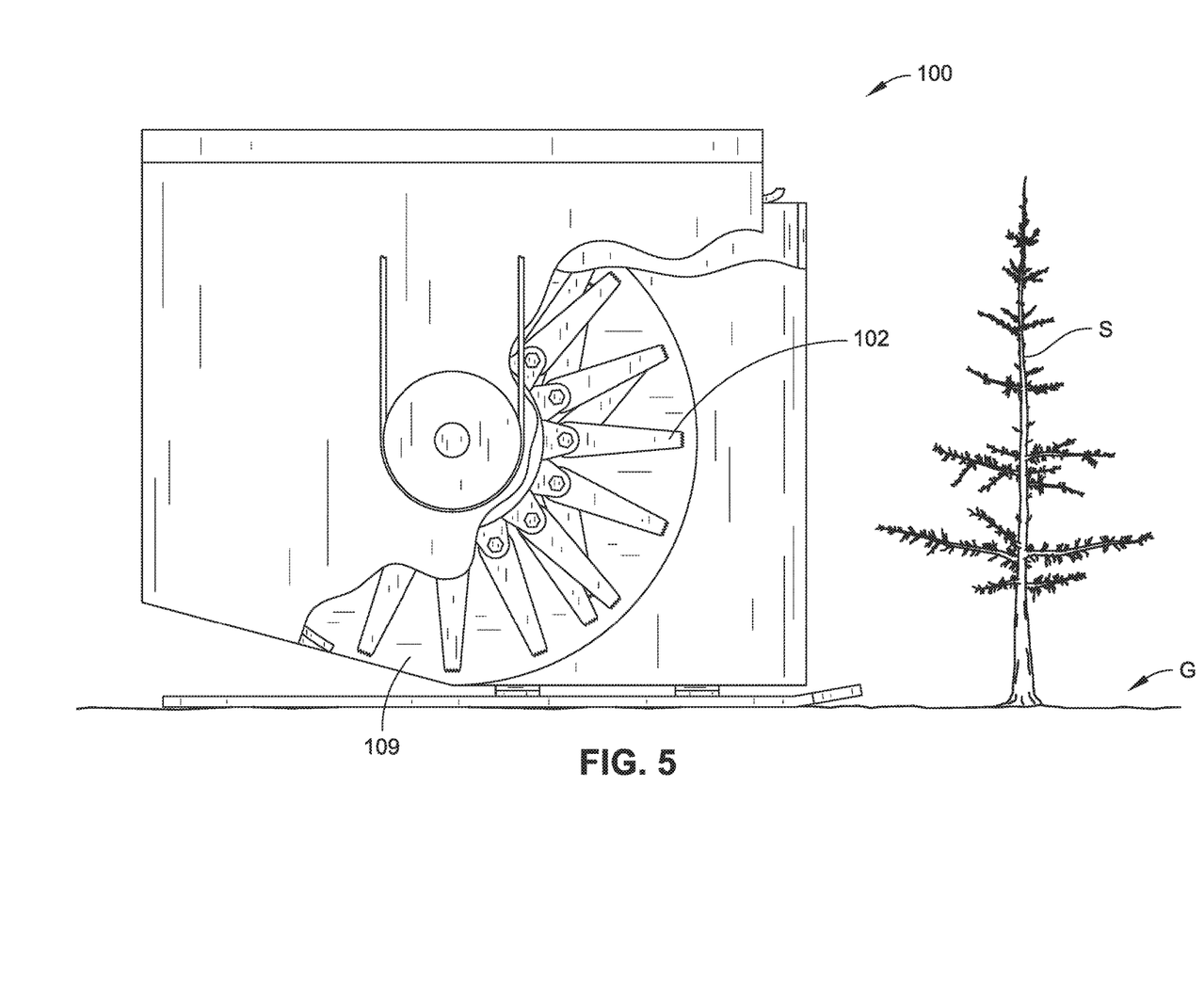
FIG. 5 is a front, isometric view of the sapling reducing implement shown in FIG. 1, approaching a sapling that is to be reduced.

The shields 103 provide a framework for mounting and otherwise at least partially enclosing the drum 101, the reducing elements 102, the bearing units 106, the interior guide member 107, and the shaft 108, the sum portions and/or combinations thereof which may collectively be considered to be a hammermill H. The plurality of shields 103 together define, at least in part, an enclosure E of the hammermill H. The shaft 108 can extend from opposite ends of the drum 101 and, in embodiments, can extend through the drum 101. The shaft 108 can be respectively rotatably mounted relative to the side shields 103d, 103e via the corresponding bearing units 106 residing therein, thereby allowing the drum 101 and the reducing elements 102 to be carried by the side shields 103d, 103e. In embodiments, the drum 101 and the shaft 108 are generally perpendicular to the side shields 103d, 103e, and the reducing elements 102 generally extend parallel to the side shields 103d, 103e. The recessed shield areas 110a, 110b are respectively configured to receive corresponding drum ends 112a and 112b and outermost reducing elements 102a and 102b (e.g., a single reducing element or a set thereof for each of 102a, 102b) respectively associated with a corresponding drum end 112a and 112b. The recessed shield areas 110a, 110b cooperate with the opposed drum ends 112a, 112b and the outermost reducing elements 102a, 102b in a manner to help contain any entering sapling S (such as shown in FIGS. 4-5) within the hammermill H. The outwardly curved front shields 105 may respectively be integral with or attached (e.g., via welding) to a corresponding side shield 103d, 103e and/or the top shield 103a. The outwardly curved front shields 105 can help guide a sapling S into the hammermill H.

Additionally, the recessed shield areas 110a, 110b are sized to provide a clearance zone with the corresponding adjacent reducing elements 102a, 102b, e.g., to reduce the chances for wear of the outermost reducing elements 102a, 102b and/or to give space to allow for some deflection and/or lateral (i.e., relative to the shaft 108) movement of the reducing elements 102. In some embodiments, the bearing units 106 may protrude from respective recessed shield areas 110a, 110b and into contact with the corresponding outermost reducing elements 102a, 102b (e.g., to help prevent contact of the outermost reducing elements 102a, 102b with the respective recessed shield areas 110a, 110b). The shields 103 may be made of any material (e.g., metal, composite, or plastic) and/or of any material thickness that is capable of providing the level of structural integrity and/or wear and impact resistance needed for the present use environment. Although not expressly shown, angle iron portions may be employed, for example, to provide reinforcement at corners created at adjoining shields 103 or to facilitate mounting of a drive unit D to one of the shields 103.

As best seen from FIGS. 1, 2, 5, and 6, the shields 103, the ground skids 104, and the interior guide member 107 of the hammermill H together define an open tree entrance T at a front or forward end of the sapling reducing implement 100. In some embodiments, the tree entrance T is about 25-30 inches tall and may, for example, be 1-3 feet wide. That said, other sizes for the tree entrance T may be employed and be within the scope of present sapling reducing implement 100. As a whole, the forward portions of the shields 103, ground skids 104, and the interior guide member 107 may be angled and/or curved in a manner (e.g., wider at the tree entrance T to narrower into the hammermill H) so as to help direct a sapling S or other woody vegetation into the enclosure E of the hammermill H and thus toward the reducing elements 102. For example, as seen from FIG. 4, the forward portions of the side shields 103d and 103e respectively include a curved portion in the form of a corresponding outwardly curved front shield 105, while the ground skids 104 define an angled face A.

Figure 2:
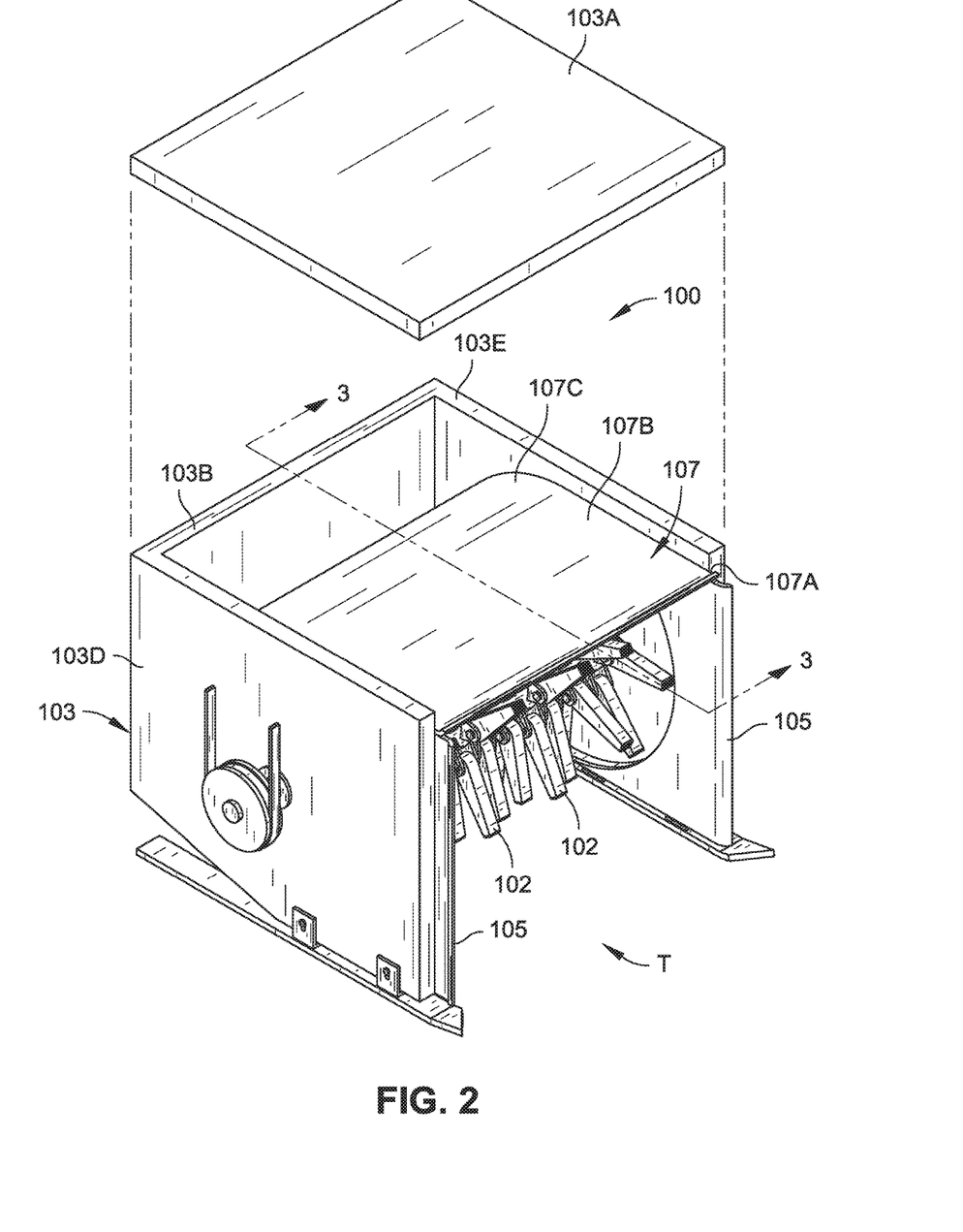
FIG. 2 is front, isometric view of the sapling reducing implement shown in FIG. 1, with the top shield exploded for ease of viewing of the interior guide member.
Figure 3:
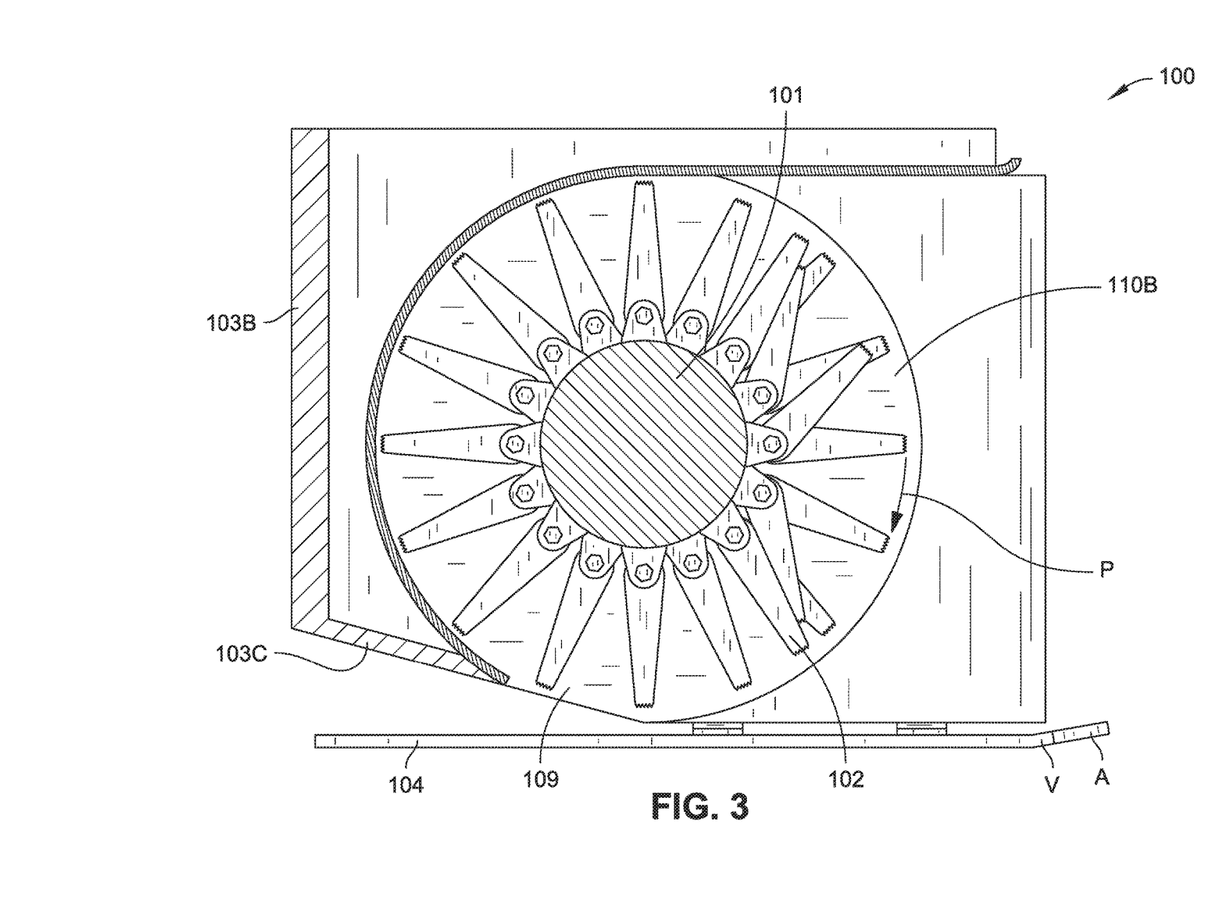
FIG. 3 is a cross-sectional view, taken along line 3-3, of the sapling reducing implement shown in FIG. 2.

Interior guide member 107 may, as shown in FIGS. 2 and 3, define an upwardly curved leading edge 107a (i.e., proximate the tree entrance T), a straight guide section 107b, and a curved or arcuate rear guide section 107c. In some embodiments, the interior guide member 107 is attached, for example, by welding and/or mechanical fasteners to the respective side shields 103d and 103e. The upwardly curved (i.e., toward the top shield and vertically away from the tree entrance T) leading edge 107a is configured to guide any sapling S of a height extending above the curved leading edge 107a into the tree entrance T. The next section of the interior guide member 107, the straight guide section 107b, is configured to direct a given sapling S toward the reducing elements 102 and help ensure engagement of the sapling with some portion of the reducing elements 102. The curved rear guide section 107c extends around behind the reducing elements 102 (relative to the tree entrance T) and is designed to follow a radial path P established by the rotation of the reducing elements 102, providing a slight clearance (e.g., one inch or less; or ½ inch or less) with the reducing elements 102, until reaching the tree residue exit 109. The curved rear guide section 107c can help contain any portions of the sapling S in the area behind the center plane (not labeled) of the drum 101 until reaching the tree residue exit 109.

In the illustrated embodiment, the radial path P is set to follow a clockwise direction. By following a clockwise radial path P (e.g., reducing elements 102 traveling toward the ground G while facing the tree entrance T), the hammermill H can promote a flow of reduced sapling portions out of the tree residue exit 109 and toward a backside of the sapling reducing implement 100. Also, the use of a clockwise radial path P may provide additional time for any potential clogs to clear before the reducing elements 102 again contact a given sapling S. If the radial path P is instead chosen to follow a counterclockwise rotation (e.g., reducing elements 102 traveling away from the ground G while facing the tree entrance T) of the drum 101, the curved rear guide section 107c may, for example, increase the opportunity for impact with the reducing elements 102 and enable concordant material reduction over a longer path than may be possible when using a clockwise radial path P.

Figure 1:
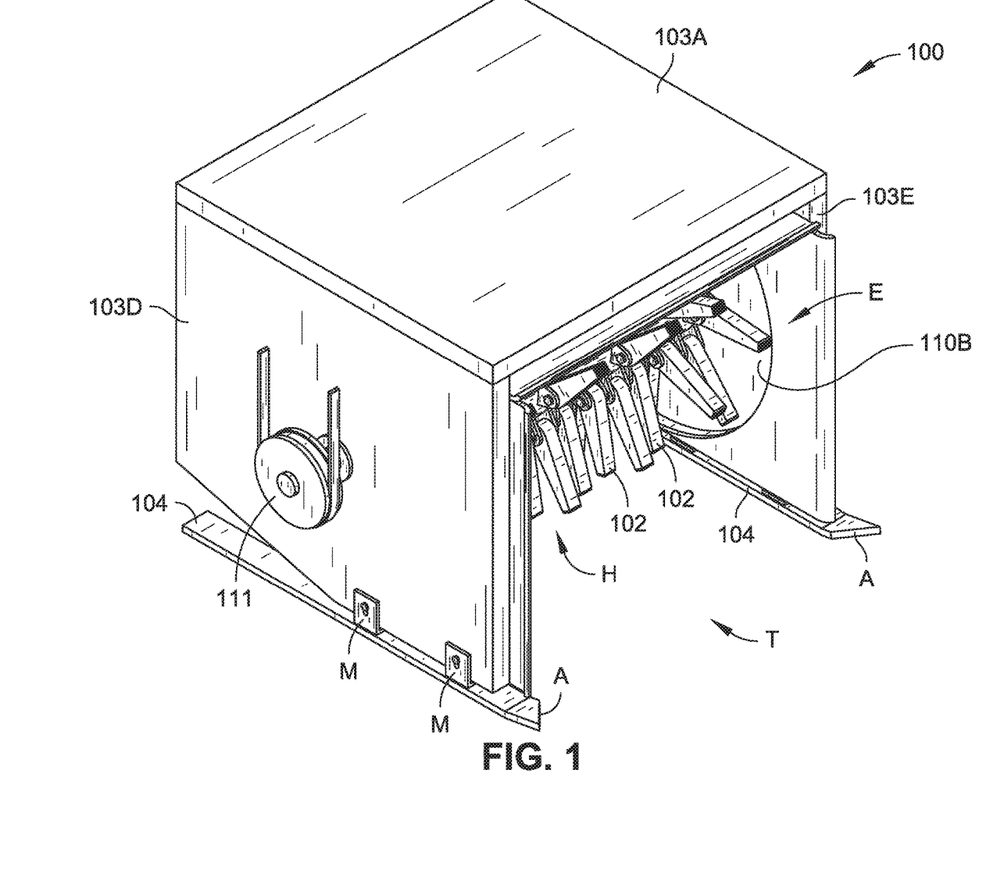
FIG. 1 is a front, isometric view of the sapling reducing implement, in accordance with an example implementation of the present disclosure.

In some embodiments, the reducing elements 102 are mounted to the drum 101 in a balanced pattern (i.e., aligned to be both statically and dynamically balanced). The balanced pattern may be such that one reducing element 102 or a plurality of reducing elements 102 is aligned within any given cyclical path along the length of the drum 101, as can be seen in FIG. 4, thereby ensuring the capability of the reducing elements 102, separately or collectively, to impact a sapling S or other woody vegetation located anywhere across a width of the hammermill H. In some embodiments, the pattern is arranged such that more than one reducing element 102 is in each given cyclical path, thereby providing multiple opportunities to strike and thereby reduce the sapling S in a particular cyclical path during each cycle (i.e., one full rotation of the drum 101). In some embodiments, such as seen in FIG. 1, the reducing elements 102 are respectively pivotally mounted to the drum 101 about a corresponding axis X. In some embodiments (not shown), the reducing elements 102 may be fixedly mounted to the drum 101 (for example, if a better transfer of energy from the drum 101 to the reducing elements 102 is desired). In embodiments, the reducing elements 102 extend (e.g., generally radially) away from the drum 101, whether pivotally or fixedly mounted relative thereto. The reducing elements 102 may include flails, knives, or a combination thereof. The reducing elements 102 may be configured to reduce the saplings or other woody vegetation via cutting, impaction, grinding, or some combination of such actions.

The ground skids 104 serve as supports upon which the hammermill H and, if carried by the hammermill H, upon which the drive unit D can ride. The ground skids 104 are configured to engage the ground G and thereby support the sapling reducing implement 100. In some embodiments, there is a pair of skids 104, a respective one on each side of the tree entrance T, and the skids 104 may aid (e.g., via angled leading end A) in guiding a given sapling S into the tree entrance T. In some embodiments, those same leading ends may display a vertical curvature V (i.e., vertically, upwardly curved) to promote traversal of the terrain. In some embodiments, the vertical curvature V is limited to the laterally-slanted portion to help ensure that sapling S enters the hammermill H and is not simply ran over by the skid 104.

The skids 104 can also aid in maintaining an appropriate spacing between the rotatable reducing elements 102 and the ground G. Particularly, it can be desirable to minimize contact with the ground G to avoid unnecessary wear of the reducing elements 102, while keeping the reducing elements 102 coming close enough to the ground G (i.e., at the downward portion of their radial path) so as extend to a point below any lowest branches of a sapling S. In some embodiments, the skids 104 may include a plurality of vertical adjustment mounts M (e.g., brackets with respective vertical mounting slots (e.g., ¼-¾ inch long, or, more particularly, ½ inch long), as illustrated, or a set of vertically-spaced mounting holes (not illustrated)) to which the side shields 103d and 103e may be selectively bolted, thereby allowing adjustment of the position of the hammermill H relative to the ground G.

The skids 104, in some embodiments, may be formed of angle iron portions, offering additional structural integrity and/or reducing the opportunity for blow-out of sapling portions between the side shields 103d and 103e and their respective skids 104. In instances where the skids 104 are formed of angle iron, the vertical adjustment mounts M may be integrally incorporated into the upper portion (e.g., portion parallel to a given side shield 103d, 103e) of the angle iron, with the lower portion of the angle iron serving as the ground engaging portion of a respective skid 104. In yet another embodiment, the one or more adjustment mounts M may be part of an extended angle iron portion separately attached to a corresponding skid 104. Such an extended angle iron portion may also help minimize blow out of reduced sapling portions from between a given side shield 103d, 103e and a corresponding skid 104.

Figure 6:
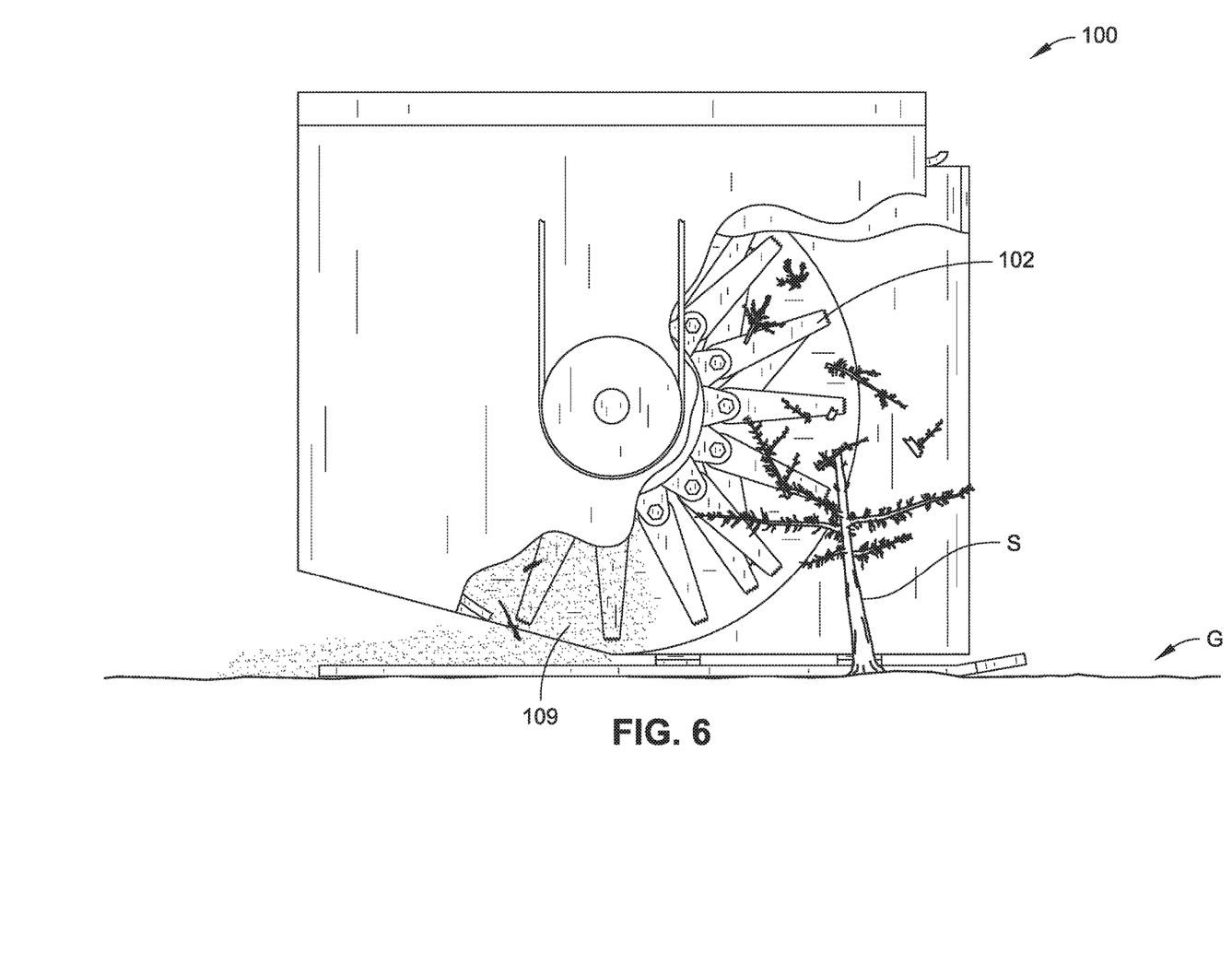
FIG. 6 is a front, isometric view of the sapling reducing implement shown in FIG. 4, now reducing the sapling.

FIGS. 5 and 6 illustrate the sapling reducing implement 100 in use to reduce a sapling S. Particularly, FIG. 5 shows the sapling reducing implement 100 in its approach to a sapling S, while FIG. 6 shows the sapling reducing implement 100 moved into a position where the reducing elements 102 of the hammermill H are able to impact and thereby reduce (e.g., chop, mulch, pulverize, grind) the sapling S. While shown as reducing a sapling S, it is to be understood that the sapling reducing implement 100 may be used to reduce other woody vegetation, such as brush or small trees, as well.

Figure 7:
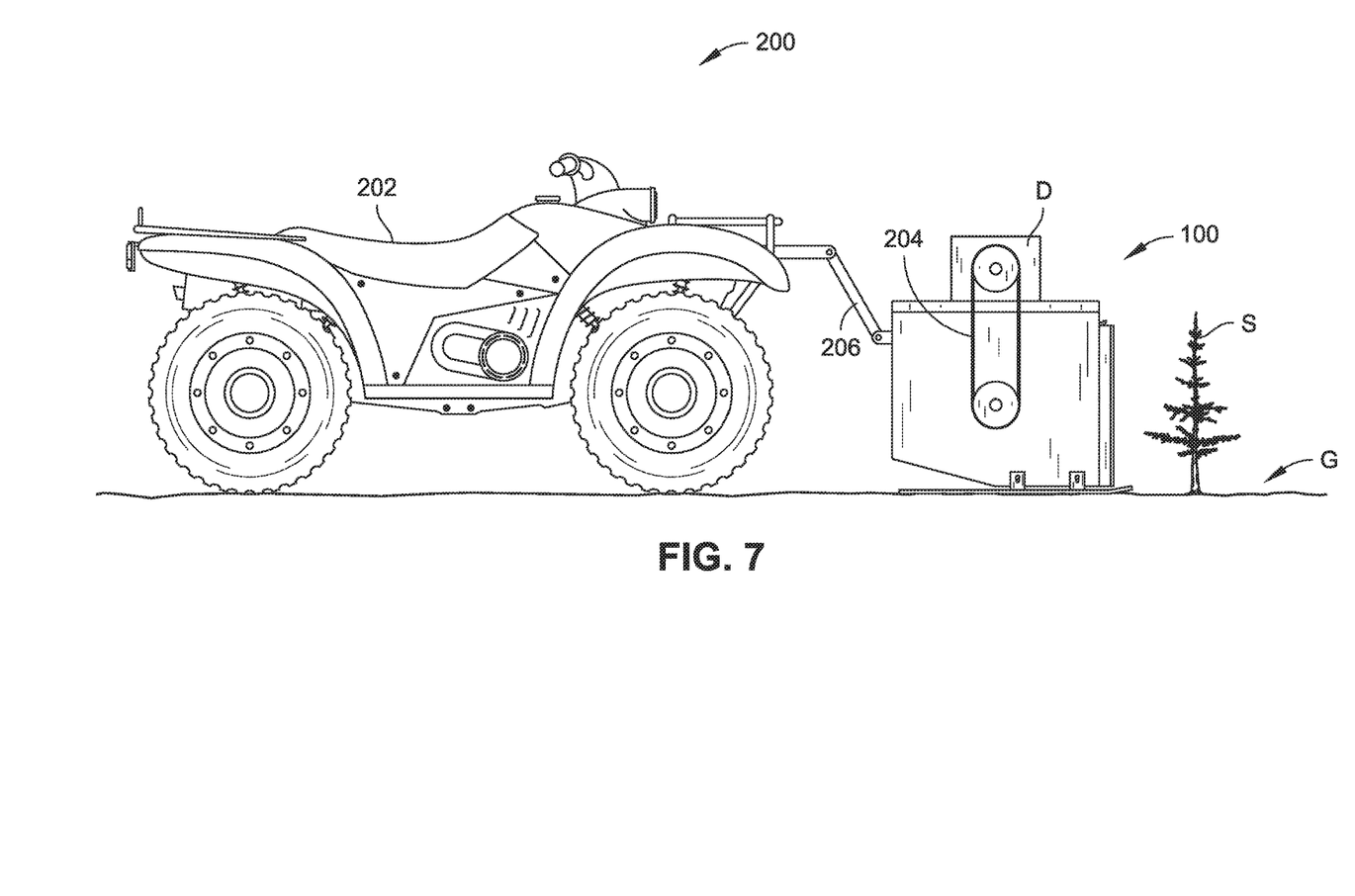
FIG. 7 is a side view of the sapling reducing implement shown in FIG. 1, mounted to an off-road vehicle.

FIG. 7 shows a vehicular system 200, in accordance with an example embodiment of the present disclosure, that includes a sapling reducing implement 100, an off-road vehicle 202, a drive unit D (e.g., engine or motor), and drive linkage 204 (e.g., shown as a belt in FIG. 7 but may be, for example, in the form of one or more gears). The drive unit D can be carried by sapling reducing implement 100 (e.g., carried on it, per the illustrated embodiment). The off-road vehicle 202 can, by way example, be an all-terrain vehicle (ATV), a mule vehicle, a skid loader, a tractor (e.g., garden or full size), a mini skid steer, or other utility vehicle. The drive linkage 204 can provide an operative link between the drive unit D and the shaft 108 (i.e., for driving the drum or rotor 101) via the drive connection 111 to transfer power and/or torque from the drive unit D to the shaft 108. In some embodiments, the drive unit D and the drive connection 111 are configured to rotate the drum 101 and the reducing elements 102 in a counter-clockwise direction, thus, for example, allowing the length of the curved rear guide section 107c of the interior guide member 107 to serve as a reducing zone. It is to be understood that the drive unit D may, instead, be directly connected to the shaft 108 (e.g., in a case where the drive unit D is mounted at side of the sapling reducing implement 100). The vehicular system 200 further includes an implement mount 206, and the implement mount 206 can be configured to allow the off-road vehicle 202 to carry the sapling reducing implement 100 and, by extension, the drive unit D. The implement mount 206 may further be configured to adjustably pivot between a use (i.e., down) position and a travel (i.e., up) position. It is to be understood that the drive unit D may be a stand-alone unit or may be powered via the engine or motor (not shown) associated with the off-road vehicle 202 (e.g., via a power-take-off (PTO) drive).

Figure 8:
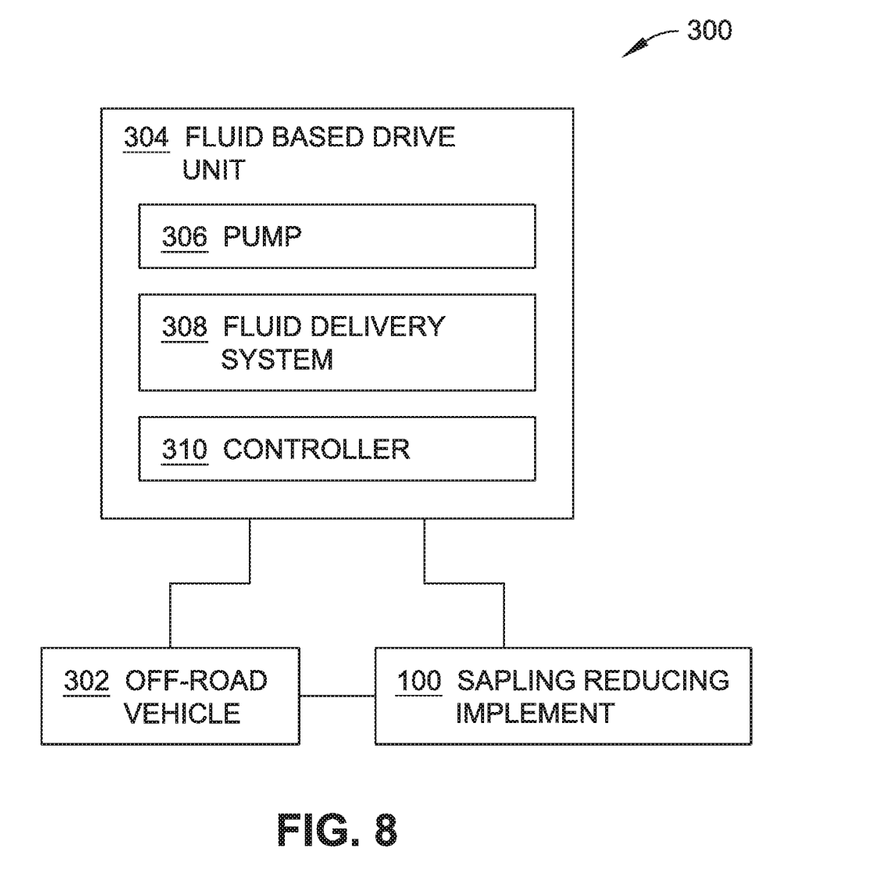
FIG. 8 is a diagrammatic view of a sapling reducing implement, carried by a vehicle and employing a fluid-based drive device, in accordance with an example implementation of the present disclosure.

FIG. 8 diagrammatically illustrates a vehicular system 300, in accordance with another example embodiment of the present disclosure, which provides for a sapling reducing implement 100, an off-road vehicle 302, and a fluid-based drive unit 304 (e.g., hydraulic or pneumatic drive). The fluid-based drive unit 304 serves a similar purpose and function as the drive unit D in the previously discussed examples (i.e., providing torque and/or power for driving the sapling reducing implement 100). The sapling reducing implement 100 and the fluid-based drive unit 304, per the illustrated embodiment, are carried by the off-road vehicle 302. In some embodiments, the fluid-based drive unit 304 may be an integral portion of the off-road vehicle 302. The fluid-based drive unit 304 is operatively connected to the drive connection 111 of the sapling reducing implement 100 in a manner to facilitate transfer of power and/or torque to the shaft 108 thereof. In some embodiments, the fluid-based drive unit 304 can include, for example, a pump 306, a fluid delivery system 308, and a controller 310. It is to be understood that the drive connection 111 may be modified, as needed, to appropriately link with the fluid-based drive unit 304.

While the sapling reducing implement 100 has been described primarily as being used to reduce saplings, it is to be understood that it may, in embodiments, be used to reduce other types of woody vegetation, such as brush or small trees, and still be within the scope of the present system.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A reducing implement for reducing woody vegetation, the reducing implement comprising:
    a drum configured to be rotatably driven by a drive unit;
    a plurality of reducing elements mounted to the drum;
    a plurality of shields at least partially surrounding the drum and the reducing elements, the plurality of shields including a pair of side shields, the drum being rotatably mounted relative to the side shields, the shields define, at least in part, an enclosure of a hammermill; and
    an interior guide member extending between the pair of side shields, the interior guide member including a straight guide section and a curved rear guide section, the straight guide section configured to direct the woody vegetation toward the reducing elements, the curved rear guide section extending around behind the reducing elements, the drum, the reducing elements, and the interior guide member at least partially defining the hammermill; and
    a pair of ground skids respectively mounted on the corresponding side shields, the ground skids configured to engage an underlying ground, the side shields, the interior guide member, and the ground skids, at least in part, defining an open forward entrance to the hammermill, the open forward entrance being opposite to the curved rear guide section of the interior guide member and configured to extend up from the ground, the open forward entrance configured to approach and receive the woody vegetation.

2. The reducing implement of claim 1, further comprising an interior guide member mounted to the respective side shields and extending therebetween.

3. The reducing implement of claim 2, wherein a residue exit is defined between a lower most portion of the interior guide member and the reducing elements, the residue exit configured to permit woody residue to exit the reducing implement and onto the ground.

4. The reducing implement of claim 1, wherein the reducing implement is configured to be attached to an off-road vehicle.

5. The reducing implement of claim 1, wherein the reducing elements are configured to extend within an inch of the ground during a downward portion of a rotational cycle associated with the drum.

6. The reducing implement of claim 1, wherein the reducing elements are comprised of at least one of flails or knives.

7. The reducing implement of claim 1, wherein at least a portion of each reducing element is at least one of hardfaced or hardened.

8. The reducing implement of claim 1, wherein the reducing elements extend away from the drum.

9. The reducing implement of claim 1, wherein the reducing elements are mounted to the drum in a pattern such that at least one reducing element is aligned within any given cyclical path along a length of the drum.

10. The reducing implement of claim 1, wherein the ground skids are mounted relative to the corresponding side shields in a manner to maintain a desired spacing between the reducing elements and a ground area contacted by the ground skids.

11. The reducing implement of claim 1, wherein at least one of the shields and the ground skids includes a forward angled portion for directing woody vegetation into an enclosure defined at least in part by the plurality of shields.

12. The reducing implement of claim 1, further comprising a drive unit operatively coupled with the drum.

13. The reducing implement of claim 1, further comprising a shaft extending from opposite ends of the drum, the shaft being rotatably mounted to the pair of side shields.

14. The reducing implement of claim 8, wherein the pair of side shields respectively defines a corresponding recessed shield area therein, the drum defining a pair of opposed drum ends, each respective recessed shield area receiving a corresponding drum end therein.

15. The reducing implement of claim 14, wherein at least one outermost reducing element is associated with a corresponding drum end, the least one outermost reducing element being received within a respective recessed shield area.

16. A vehicular system, comprising: an off-road vehicle;
a reducing implement attached to the off-road vehicle, the reducing implement comprising:
a drum configured to be rotatably driven;
a plurality of reducing elements mounted to the drum;
a plurality of shields at least partially surrounding the drum and the reducing elements, the plurality of shields including a pair of side shields, the drum being rotatably mounted relative to the side shields, the shields define, at least in part, an enclosure of a hammermill; and
an interior guide member extending between the pair of side shields, the interior guide member including a straight guide section and a curved rear guide section, the straight guide section configured to direct the woody vegetation toward the reducing elements, the curved rear guide section extending around behind the reducing elements, the drum, the reducing elements, and the interior guide member at least partially defining the hammermill;
a pair of ground skids respectively mounted on the corresponding side shields, the ground skids configured to engage an underlying ground, the side shields, the interior guide member, and the ground skids, at least in part, defining an open forward entrance to the hammermill, the open forward entrance being opposite to the curved rear guide section of the interior guide member and configured to extend up from the ground, the open forward entrance configured to approach and receive the woody vegetation; and a drive unit operatively linked to the drum, the drive unit configured to rotate the drum.

17. The vehicular system of claim 16, wherein the off-road vehicle is one of an all-terrain vehicle, a mule vehicle, a skid loader, a mini skid steer, and a tractor.

* * * * *